April 1, 1969     KEIICHI SHIMIZU ET AL     3,436,323

ELECTROLYTIC METHOD FOR PREPARING MANGANESE DIOXIDE

Filed July 25, 1966

Keiichi Shimizu; Tatsuya Takekawa; Nobuo Tamaki; Takashi Takasue; Toshio Suemoto; and Kazuo Mase INVENTORS BY George B. Aujevolk
Attorney

United States Patent Office 3,436,323
Patented Apr. 1, 1969

3,436,323
ELECTROLYTIC METHOD FOR PREPARING MANGANESE DIOXIDE
Keiichi Shimizu and Tatsuya Takekawa, Tokyo, Nobuo Tamaki, Amagasaki-shi, Takashi Takasue, Saitama-ken, Toshio Suemoto and Kazuo Mase, Takehara-shi, Japan, assignors to The Furukawa Electric Co., Ltd., and Mitsui Mihonbashi Muromachi, Tokyo, Japan, both corporations of Japan
Filed July 25, 1966, Ser. No. 568,370
Int. Cl. B01k 3/04, 3/06
U.S. Cl. 204—96        14 Claims

ABSTRACT OF THE DISCLOSURE

Method of preparing manganese dioxide by electrolysis of an aqueous solution containing sulfuric acid and manganese sulfate wherein the improvement resides in the use of an anode which is titanium, zirconium or tantalum having a finely and sharply indented adventurine surface.

---

This invention relates to a method for preparing electrolytic manganese dioxide, and especially to a method having more efficient productivity of electrolytic manganese dioxide by using a novel anode than ever.

It is well known in the art that electrolytic manganese dioxide which is used as a depolarizer for a dry battery is produced by the electrolysis of an aqueous solution containing from 0.2 to 0.5 mol per liter of sulfuric acid and from 0.5 to 1.0 mol per liter of manganese sulfate using graphite or lead alloy materials for the anode and the cathode.

In the case of such conventional method, however, it has been impossible to avoid contamination by a small quantity of graphite or lead as an impurity in the electrolytic manganese dioxide produced, and also impossible to avoid an economical loss of damaging the anode because of the fact that, in the case of using a graphite anode as the anode, the deposited electrolytic manganese dioxide is deeply attached to the anode surface, and it then becomes difficult to strip the deposit layer from the anode without damage. Moreover, the conventional method has another weak point in that the graphite is damaged when oxidized by nascent oxygen produced on the anode during electrolysis, and particularly it is severely damaged in the electrolyte of higher current density and higher acidity.

Investigations have been made to improve the productivity and the quality for electrolytic manganese dioxide using new industrial materials for the electrode, but these have not been carried out into practice industrially.

As the industrial materials for the anode other than graphite and lead alloys, titanium, zirconium and tantalum have been already suggested. These metals have excellent corrosion resistivity in any acidic solution, good mechanical characteristics and relatively high workability, and so they can not only be readily fitted to the electrodes, but can be stripped off from the deposit on the electrode without damaging the electrode. Therefore, if these metals can be used as the anode for producing electrolytic manganese dioxide, long life of the anode, high productivity of manganese dioxide, and high quality of the products may be expected.

Titanium has already been used as the cathode or the electrolysis of metallic manganese and mother plates for preparation of starting sheets of copper electrolysis.

However, by using the metal selected from a group consisting of titanium, zirconium and tantalum as the anode, the surface of the anode may be gradually oxidized by nascent oxygen produced on the anode, and forms a thin and tight oxide film. As this oxide has high electric resistance, the electric conductivity of the anode surface becomes so bad with the growth of the oxide film that the cell voltage gradually increases, and finally the phenomenon of passivation, i.e., almost no flowing of the electric current, may happen. Therefore, titanium, zirconium or tantalum have not been used industrially as the anode material.

In order to use titanium, zirconium or tantalum as the anode with no occurrence of passivation, good results may be obtained by preventing the formation of the oxide film on the electrode surface during electrolysis. As the methods of prevention, the following three methods can be considered:

(1) The surface of titanium, zirconium or tantalum anode may be covered with some noble metals to protect it from oxygen gas produced on the anode.

(2) Reducing agents having a larger affinity to oxygen than Ti, Zr, or Ta may be added to the anode material to remove the oxygen gas before it reaches the surface of the electrode.

(3) A reagent which can immediately dissolve the oxide film may be added to the electrolyte.

As an example of the first method, it has been suggested that a platinum plated titanium plate should be used for the anode of water electrolysis. However, in this case, the consumption of plated platinum during electrolysis, can not be ignored, and it is economically difficult to apply this method for the electrolysis of manganese dioxide.

An example of the second method has been found in U.S. Patent 2,608,531. In this method, crushed sponge titanium which afterwards was compacted in the form of anode under pressure, has been treated by heating in vacuum or in an inert gas atmosphere, and then treated wtih diluted hydrochloric acid, and as a result the anode contained proper amounts of hydrogen gas. Such plate has been used for the anode of the electrolysis of manganese dioxide, but this electrode has a weak point in mechanical characteristics and has some troublesome problem in supplying hydrogen gas in the case of repeated use.

And as an example of the third method, it has been suggested that the electrolyte of electrolytic manganese dioxide should be added with fluorine ion. In this case, however, it is also difficult to remove the oxide film perfectly and to contaminate the product with fluorine ion.

An object of the present invention is to produce electrolytic manganese dioxide having high quality by using a metal selected from a group consisting of titanium, zirconium and tantalum which has excellent workability, good mechanical characteristics and high corrosion resistivity for the anode.

Another object of the present invention is to effectively obtain a thick deposit of electrolytic manganese dioxide in accordance with smooth and continuous electrolysis for a long period using a metal selected from a group consisting of titanium, zirconium, and tantalum for the anode.

A further object of the present invention is to easily strip a deposit of electrolytic manganese dioxide from the anode, to work the anode more effectively and to increase its life.

And a further object is to promote the productivity of electrolytic manganese dioxide by using the electrolyte of higher sulfuric acid concentration.

The above objects may be attained by the present invention by using an anode of a metal selected from a group consisting of titanium, zirconium, and tantalum having a finely and sharply indented aventurine surface.

The features of the invention which are believed to be novel are set forth with particularity in the appended claims. The invention itself as well as its structure, further objects and advantages may be best understood by the following description and the accompanying drawing, in which:

Figure 1:
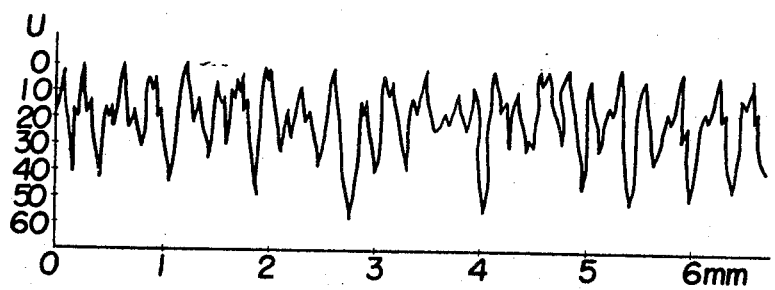
FIG. 1 shows a recorded chart of surface coarseness by a roughness tester in Example 1.

Considering how to effectively use a metal selected from the group consisting of titanium, zirconium and tantalum which has an excellent corrosion resistivity, good mechanical characteristics and high workability for the anode to produce electrolytic manganese dioxide, we have investigated the way to use one of these metals as the anode. As a result of this invention, we have found that a homogeneous, very pure and thick (maximum thickness being 50 mm.) deposit of electrolytic manganese dioxide can be produced under high current efficiency without accompanying passivation by using the plate, rod or tube anode of the above-mentioned metal instead of the anode metal having porous structure shown in U.S. Patent 2,608,531, making the surface of the anode an aventurine form. By this way, the oxidation on the anode surface can be kept away, and any cracking or peeling off of the electrolytic manganese dioxide deposit during electrolysis by its electro-deposition stress can also be prevented.

By making the surface of the anode in an aventurine form, the effective anode area is greatly increased, and it becomes possible to carry out the electrolysis with a remarkably smaller true current density. Therefore, the growth of oxygen gas on the anode is restrained and the electrolytic manganese dioxide may be deposited before the surface is oxidized. Further, the deposited electrolytic manganese dioxide fits together with the aventurine structure of the anode surface, the electrodeposition stress in the deposit being supported by the aventurine structure, and so the deposit is protected from cracking and peeling off during electrolysis.

To make the anode surface in an aventurine form, there are two methods, chemical and mechanical. But in the case of practising the present invention, the mechanical method, for instance sandblasting, is more suitable than the chemical one, because a very large number of small regular and sharp hollows are uniformly indented in the surface of the anode, and the deposit is more tightly fitted, standing against the electrodeposition stress more effectively than in the case of the chemical method.

To carry out the sandblasting method effectively it is necessary to determine the most suitable technical condition, i.e., the kind, sharpness, particle size and the moisture content of the sand to be used, and also the sandblasting procedure.

In general, the concentration of sulfuric acid in the electrolyte for electrolytic manganese dioxide is from 0.2 to 0.5 mol per liter. If the acidity of the electrolyte were higher, the oxidation of manganese on the anode would become better, diminishing the content of lower oxide of manganese in the product, and more active electrolytic manganese dioxide for the dry battery would be obtained.

We have found that use of the anode of titanium, zirconium or tantalum having an aventurine surface causes on passivation phenomenon not only in the electrolyte containing from 0.2 to 0.5 mol per liter of sulfuric acid but also in electrolyte containing 0.8 mol per liter of the acid. It may be the reason that the effective anode becomes extremely large, decreasing the true anode current density, by making the anode surface in an aventurine form.

We have also found as a result of further investigation that, after the electrolysis is carried out with the electrolyte containing from 0.2 to 0.8 mol per liter of sulfuric acid and thin electrolytic manganese dioxide film of a thickness of about $5\mu$ or over is produced on the anode surface, neither cracking and peeling off of the deposit nor passivation phenomenon of the anode is observed, even if the electrolysis is continued by the electrolyte containing over 0.8 mol per liter of sulfuric acid. But if the concentration of sulfuric acid in the electrolyte becomes more than 1.2 mol per liter, the passivation phenomenon may occur.

To prepare beforehand a tight and minute thin deposit of electrolytic manganese dioxide, about $5\mu$ thick, on the aventurine surface of the anode, such process is suitable as uses the electrolyte containing from 0.5 to 1.0 mol per liter of manganese sulfate and from 0.2 to 0.4 mole per liter of sulfuric acid, electrolysis being performed for from 10 to 24 hours under an anode current density of from 0.7 to 1.0 a./dm.$^2$. Depending on the coarseness of the aventurine surface, the same object is attained by using particularly high acidic electrolyte containing from 0.2 to 0.5 mol per liter of manganese sulfate and from 0.7 to 0.8 mol per liter of sulfuric acid, and performing electrolysis for about 24 hours under the low anode current density of under 0.1 a./dm.$^2$.

In the present invention the most suitable coarseness of the aventurine surface of the anode is influenced by the condition of the electrolysis. In case of using the electrolyte containing from 0.2 to 1.2 mol per liter of sulfuric acid, the preferable value of average coarseness is from 20 to $60\mu$.

The process of the present invention will be more fully understood by the following examples.

Example 1

A series of preliminary tests for the electrolysis for preparing manganese dioxide was carried out under the following conditions:

Bath temperature _____ °C__ 90–95
Distance between adjacent electrode surfaces
                                                    mm__ 50
Anode current density _____ a./dm.$^2$__ 0.9

For the above several rolled titanium plate anodes of 100 mm. x 200 mm. x 4 mm. size and graphite plate cathodes of the same size and also electrolyte containing 0.4 mol per liter of sulfuric acid and 1.0 mol per liter of manganese sulfate were used. The surface coarseness of each anode was changed by controlling the sandblasting process as shown in Table 1.

"Surface coarseness" is represented by the depth of crowded fine hollows indented on the anode surface.

As a result of these preliminary tests, we could know the rough tendency about the electrolysis. The tests No. 6 and No. 7 in the Table 1 are for comparative cases using the anode of aventurine surface produced by chemical etching with hydrochloric acid instead of sandblasting.

TABLE 1.—PRELIMINARY TEST RESULTS OF Ti, ANODES HAVING VARIOUS AVENTURINE SURFACES

| Test No. | Average coarseness ($\mu$) | Maximum coarseness ($\mu$) | Aspects of the deposit |
| --- | --- | --- | --- |
| 1 | 10 | 15 | Peeled off and passivated for about 3 hours. |
| 2 | 20 | 26 | Partially peeled for about 3 hours. |
| 3 | 30 | 38 | Homogeneous and minute deposit was gained. |
| 4 | 45 | 56 | Do. |
| 5 | 60 | 100 | Not peeled off, but passivated. |
| 6 | 20 | 25 | Peeled off and passivated for about 2 hours. |
| 7 | 35 | 43 | Do. |

From the results of these preliminary tests as shown in Table 1, it was made clear that average coarseness of from 25 to $55\mu$ is most suitable under the above-mentioned conditions, and so the continuous electrolysis operation was carried out using the titanium anode having average coarseness of $45\mu$ and maximum coarseness of 56µ like Test No. 4 under the same conditions as in preliminary tests for 7 days. Parallel with this operation we carried out for comparison the electrolysis using graphite anode under the same conditions. Electrolytes of both Ti-anode cell and C-anode cell were each circulated at constant flow rate, and the concentration of the circulated electrolyte was kept at constant value by adding neutral manganese sulfate aqueous solution of 1.4 mol per liter concentration in the circulating system.

Figure 2:
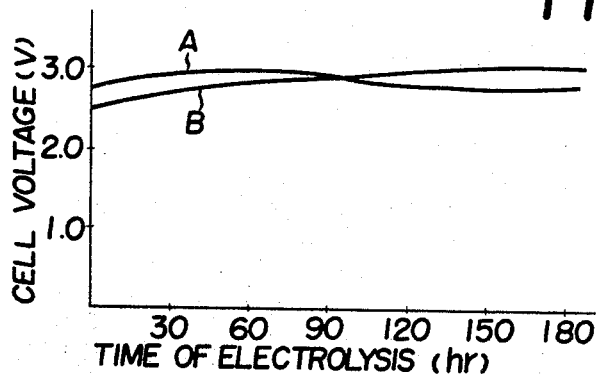
FIG. 2 shows a graph of the cell voltage relative to the duration of the electrolysis in Example 1.

FIG. 1 is one chart recording the coarseness of the aventurine surface of titanium anode in the test No. 4 of Table 1 by a usual roughness tester of needle contact type; the vertical length of the chart is 500 times the true value and the horizontal one is 20 times of the same. The average coarseness is about 45µ and the maximum coarseness is about 56µ in FIG. 1. FIG. 2 shows the function curves between cell voltage and time of electrolysis, and curve A represents the function of the cell having the titanium anode, and curve B represents the function of the cell having the graphite anode. At the start, the cell voltage of the Ti anode is higher by about 0.2 volts than of the C-anode, but after about 5 days these voltages reach equilibrium, and the cell voltage of Ti-anode is lower than that of C-anode. The current efficiency was about 97% about Ti-anode, and was about 95% about C-anode.

Figure 3:
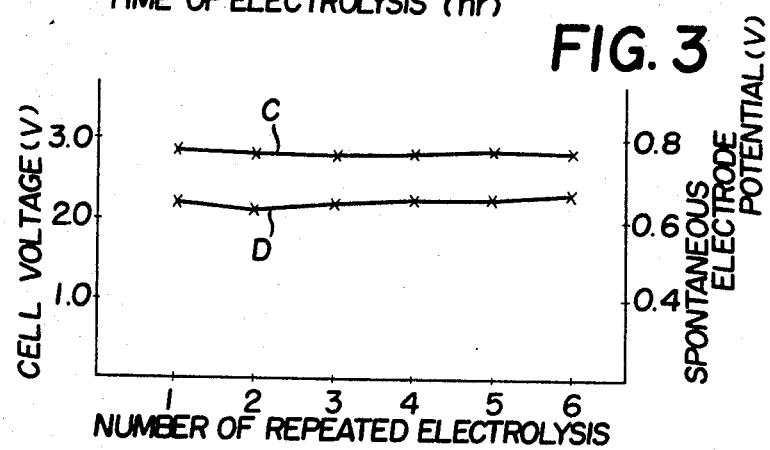
FIG. 3 shows a graph of cell voltage and spontaneous electrode potential relative to the number of repeated electrolysis in Example 1.

In FIG. 3, the plotted line C represents cell voltages for each repeated operation cycle of 7 days after stripping off the former deposit, and the plotted line D represents the spontaneous electrode potentials for each above-mentioned repeated operation cycle measured by using a saturated calomel electrode for standard with each cycle after stripping off the deposit with each cycle, and completely removing the thin layer (thickness about 5µ) of electrolytic manganese dioxide remainining on the anode surface in saturated oxalic acid solution. From line C and line D we can understand that in accordance with the method of the present invention the passivation of the titanium anode surface did not occur at all for a long time.

Table 2 shows the results of chemical analysis of electrolytic manganese dioxide obtained by using titanium anode in Example 1 and conventional graphite anode.

TABLE 2.—RESULTS OF CHEMICAL ANALYSIS OF PRODUCTS

|  | $MnO_2$ | Total Mn | MnO | Fe | Pb | Cu | C |
|---|---|---|---|---|---|---|---|
| By Ti-anode | 92.54 | 59.85 | 1.35 | 0.004 | 0.001 | 0.0002 | none |
| By C-anode | 92.12 | 59.76 | 1.52 | 0.006 | 0.002 | 0.0001 | 0.50 |

Example 2

The continuous production of electrolytic manganese dioxide of about one year was performed under the following conditions of electrolysis, by the use of corrugated plates of rolled titanium as anodes of which corrugated radii were from 10 to 30 mm., and their size was 110 mm. x 450 mm. x 2 mm., having the same surface coarseness as Test No. 4 in Example 1, and also of graphite plates as cathodes.

Electrolyte:

$H_2SO_4$ fluctuated between 0.3 and 0.8 mol per liter
  $MnSO_4$ fluctuated between 0.9 and 1.4 mol per liter Distance between adjacent electrode surfaces: 50 mm.
Bath tempertaure: 90 to 95° C.
Anode current density: fluctuated between 0.7 and 1.0 a./dm.$^2$
Electrolysis cycle: fluctuated between 1 and 6 weeks In spite of the above-mentioned fluctuation of the conditions for the electrolysis, electrolytic manganese dioxide was always minutely deposited, and cracking or peeling during electrolysis could not be found at all. Furthermore, the work of removing deposit from the anode was easily carried out. In spite of the above-mentioned fluctuation of the conditions for the electrolysis, the nature of the produced electrolytic manganese dioxide was almost the same as shown in Table 2 of Example 1, and the product had very excellent characteristics as the depolarizer for dry battery.

Table 3 shows the surface coarseness and mechanical characteristics of the titanium anode used in the present invention method before and after one year's use.

TABLE 3.—MECHANICAL CHARACTERISTICS OF INVENTED Ti-ANODE BEFORE AND AFTER ONE YEAR'S USE

|  | Before using | After using for one year |
|---|---|---|
| Average coarseness of the Ti-anode surface (µ) | 45 | 45 |
| Maximum coarseness of the same (µ) | 56 | 56 |
| Tensile strength (kg./mm.$^2$) | 43 | 43 |
| Elongation (percent) | 37 | 36 |
| Hardness (V.H.N.) | 170 to 180 | 160 to 180 |

From the results in Table 3 it may be clear that abrasion of the anode surface and deterioration of the mechanical characteristics of the anode can hardly be found, and that it would be possible to use such anode semi-permanently.

Table 4 shows the results of discharge test for a dry battery using the produced electrolytic manganese dioxide as the depolarizer, and these values are the same as or better than the case of usually produced electrolytic manganese dioxide.

TABLE 4.—DISCHARGE TEST OF D-SIZE CELL AT 20° C.

| 4Ω Continuous discharge | | | | 4Ω Intermittent discharge (discharging for 30 minutes a day, and cycling 5 days a week) | | | |
|---|---|---|---|---|---|---|---|
| Initial open circuit voltage (v.) | Discharge duration (min.) | | | Initial open circuit voltage (v.) | Discharge duration (min.) | | |
|  | Cut off voltage | | | | Cut off voltage | | |
|  | 1.2 v. | 1.1 v. | 1.0 v. |  | 1.2 v. | 1.1 v. | 1.0 v. |
| 1.68 | 200 | 250 | 300 | 1.68 | 460 | 630 | 750 |

Example 3

Using a cylindrical zirconium anode having an aventurine surface, with an outside diameter being 30 mm., inside diameter 26 mm. and length 500 mm., with a base being closed by welding with zirconium plate, and using a graphite column cathode having 30 mm. diameter and 50 mm. length, we produced manganese dioxide by continuous electrolysis for 7 days under the following conditions. The coarseness of the anode surface was the same as in Test No. 4 of Example 1.

Electrolyte:

$H_2SO_4$—0.4 mol per litre
  $MnSO_4$—1.0 mol per litre

Bath temperature: 90 to 95° C.
Anode current density: 0.9 a./dm.$^2$
Distance between both axes of the electrodes 60 mm.

In this case too, the produced manganese dioxide was deposited on the zirconium anode surface uniformly and minutely, having no tendency to cracking and peeling, and was removed from the anode surface very easily.

In Table 5 are shown the results of chemical analysis of the product.

Table 5 Chemical analysis of the product (%)

| | |
|---|---|
| $MnO_2$ | 92.47 |
| Total Mn | 59.25 |
| MnO | 0.98 |
| Fe | 0.006 |
| Pb | 0.001 |
| Cu | 0.0002 |

Example 4

Using a compound plate anode of 50 mm. x 100 mm. x 5 mm. which was made by compressing tantalum thin plate on the whole surface of a copper plate by explosive forming method, and using a graphite plate cathode of the same size, we produced manganese dioxide by continuous electrolysis for 7 days under the conditions shown in Example 3. In this case also, the same results as in Example 3 were obtained.

Example 5

Using a rolled titanium plate anode having an aventurine surface made by sandblasting, the coarseness of the surface being average 30μ and maximum 38μ, and using a graphite plate cathode, we made a preliminary electrolysis at first under the following conditions for 24 hours.

Electrolyte:
$H_2SO_4$—0.4 mol per liter
$MnSO_4$—1.0 mol per liter
Bath temperature: 90 to 95° C.
Distance between adjacent electrode surfaces: 50 mm.
Anode current density: 0.9 a./dm.$_2$ And then manganese dioxide was produced by continuous electrolysis for 7 days under the following conditions using the anode above treated.

Electrolyte:
$H_2SO_4$—1.0 mol per liter
$MnSO_4$—0.5 mol per liter
Bath temperature : 90 to 95° C.
Distance betwen adjacent electrode surfaces: 50 mm.
Anode current density: 1.0 a./dm.$_2$ Almost the same results as in Example 1 were obtained.

What is claimed is:

1. In the method of preparing manganese dioxide by the electrolysis of an aqueous solution containing sulfuric acid and manganese sulfate, the improvement therein which is characterized by using an anode made from a metal selected from the group consisting of titanium, zirconium and tantalum, having a finely and sharply indented aventurine surface thereon.

2. The method of claim 1 wherein said anode is provided with a core of another metal.

3. The method of claim 1 wherein the aventurine surface of the anode is indented by sandblasting.

4. The method of claim 1 wherein the average coarseness of the anode surface is from 20μ to 60μ.

5. The method of claim 1 wherein a corrugated anode plate is used.

6. The method of claim 1 wherein a tubular anode is used.

7. The method of claim 1 wherein a rod type anode is used.

8. In the method of preparing manganese dioxide by the electrolysis of an aqueous solution containing sulfuric acid and manganese sulfate, the improvement which comprises using an anode made from a metal selected from a group consisting of titanium, zirconium and tantalum, indenting the surface thereof finely and sharply to produce an aventurine surface, preliminarily electrolyzing and solution containing less than 0.8 mol per liter of free sulfuric acid to produce a uniform and thin deposit layer of manganese dioxide having a thckness of at least 5μ on the aventurine surface of the anode, and subsequently electrolyzing said solution containing from 0.8 to 1.2 mols per liter of free sulfuric acid.

9. The method of claim 8 wherein said anode is provided with a core of another metal.

10. The method of claim 8 wherein the aventurine surface of the anode is indented by sandblasting.

11. The method of claim 8 wherein the average coarseness of the anode surface is from 20μ to 60μ.

12. The method of claim 8 wherein a corrugated anode plate is used.

13. The method of claim 8 wherein a tubular anode is used.

14. The method of claim 8 wherein a rod type anode is used.

References Cited

UNITED STATES PATENTS 2,608,531   8/1952   Fox _____ 204—83
3,259,475   7/1966   Burnham _____ 204—292 XR

FOREIGN PATENTS 859,723   1/1961   Great Britain.

JOHN H. MACK, Primary Examiner.
D. R. JORDAN, Assistant Examiner.

U.S. Cl. X.R.
204—292; 23—183

UNITED STATES PATENT OFFICE
CERTIFICATE OF CORRECTION

Patent No. 3,436,323  April 1, 1969

Keiichi Shimizu et al.

It is certified that error appears in the above identified patent and that said Letters Patent are hereby corrected as shown below:

In the heading to the printed specification, lines 7 and 8, "The Furukawa Electric Co., Ltd., and Mitsui Mihonbashi Muromachi, Tokyo, Japan" should read -- The Furukawa Electric Co., Ltd., Marunouchi, Chiyoda-ku, Tokyo, Japan, and Mitsui Mining & Smelting Co., Ltd., Nihonbashi Muromachi, Chuo-ku, Tokyo, Japan --.

Signed and sealed this 21st day of April 1970.

(SEAL)
Attest:

Edward M. Fletcher, Jr.
Attesting Officer

WILLIAM E. SCHUYLER, JR.
Commissioner of Patents